May 21, 1946.                R. H. HIGBY                2,400,693
              METHOD OF MANUFACTURING HESPERIDIN
                    Filed March 6, 1943

HESPERIDIN-CONTAINING SOURCE MATERIAL

1. FIRMING WITH AGITATION — AS CALCIUM CHLORIDE
2. EXTRACTION WITH AGITATION — AS NaOH
3. PRESSING - LIQUOR SAVED
4. ACIDIFICATION OF LIQUOR — AS HCl
5. HEAT + FILTER AID
6. CRYSTALLIZATION
7. FILTRATION
8. SOLUTION OF CRYSTALS — AS NaOH
9. ACIDIFICATION — AS HCl
10. CRYSTALLIZATION
11. SEPARATION OF CRYSTALS

INVENTOR
Ralph H. Higby

Attorney

Patented May 21, 1946

2,400,693

UNITED STATES PATENT OFFICE 2,400,693

METHOD OF MANUFACTURING HESPERIDIN

Ralph H. Higby, Ontario, Calif., assignor to California Fruit Growers Exchange, Los Angeles, Calif., a corporation of California Application March 6, 1943, Serial No. 478,261

9 Claims. (Cl. 260—210)

This invention relates to an improved process for the preparation of hesperidin.

Hesperidin is a natural glucoside of most citrus fruits, occurring for the most part in the albedo of the fruit. Hesperidin is found also in other plants as, for example, some of the umbelliferae and scrophularia. In my co-pending application, Serial No. 350,800, issued as Patent No. 2,348,215 on May 24, 1944, I have disclosed new and novel methods for the preparation of hesperidin from plant material containing the same. The present disclosures are concerned with modifications of that process which I have found to be of economic importance.

Heretofore in the preparation of hesperidin, I have treated crushed citrus fruit as, for example, oranges, to first coagulate the pectinous or slimy constituents of the source material so that these constituents would not interfere with subsequent operations. After coagulation of the slimy constituents, the hydrogen ion concentration of the mass was adjusted to about pH 11.0 to 11.5 by use of a suitable alkalizing substance. The suspension or slurry was agitated for a period of time to permit extraction of the hesperidin from the source material, whereupon the mass was subjected to a pressing operation for the purpose of separating the hesperidin-containing liquor from the leached peel. The liquor, containing the hesperidin in solution, was then adjusted to a pH below 9.0 by means of a suitable acid. Below about pH 9.0 the hesperidin crystallizes from solution. However, since the crystallization can proceed slowly at this point, I have found it convenient to centrifuge or filter the neutralized liquor soon after neutralization to separate fine pulp particles, undissolved lime, and other extraneous materials which tend to contaminate the hesperidin. Crystallization of the hesperidin from the liquor after separation of the extraneous materials was then allowed to proceed to near completion at room temperature, which usually was accomplished in about 48 hours after acidification. The resulting hesperidin was referred to and described by me as crude hesperidin since it usually contained some impurities.

The crude hesperidin was separated from the mother liquor and dissolved in a relatively weak alkali. The solution of hesperidin was then mixed with a quantity of alcohol to coagulate certain impurities, as pectinous materials, which were subsequently removed by filtration. The filtrate was saved and acidified to below about pH 9 and preferably to about pH 6.0, at which pH the hesperidin crystallized from solution. These crystals were then separated from the solution.

I have now discovered that important modifications of my previously disclosed method can be made which not only improve the quality of the finished product but which effect considerable saving in time of manufacture and in cost of production. Also by the improvements in my method, I am able to increase the yield of hesperidin over that obtained by the method previously disclosed.

This invention is directed, therefore, toward new and novel improvements in the manufacture of hesperidin, and more particularly, to improvements which reduce the time of preparation and increase the yield obtainable as well as the purity of the finished product. Also, the improvements to be hereinafter disclosed eliminate the use of certain reagents which are now scarce and vital to production in other fields.

Further objects and advantages of this invention will appear more fully and at large from the following description in which the preferred embodiment of this invention is described in detail in conjunction with the acompanying flow-sheet.

In the drawing there is presented a flow-sheet illustrating a preferred form of my improved process.

In carrying out my improved process relating to the production of hesperidin, I may start with any of the source materials in which hesperidin is a naturally occurring component. In the examples, I mention citrus fruit as, for example, oranges, or material prepared from oranges, as being suitable. However, I do not wish to imply that my process is limited to these source materials.

The following example is presented for illustrative purposes only and is not to be taken as limiting the disclosures in this application or my co-pending application hereinabove referred to. In general, the first few steps of my improved process are the same as that heretofore disclosed in my co-pending application. That is to say, I take an hesperidin-containing source material and preferably coagulate the slimy components thereof, as evidenced by a firming or hardening of the material, as indicated at 1 on the flow-sheet, by the use of calcium chloride, lime, or other calcium compounds while the source material is thoroughly agitated. Extraction, indicated at 2, of the hesperidin is effected by means of an alkali as, for example, sodium hydroxide. After extraction, the mass is pressed, step 3, and the pressed liquor acidified, indicated at 4, to below pH 9 and preferably in the range of from pH 4 to pH 6. It is at this point that the modification in my process heretofore disclosed takes place. Accordingly, the succeeding steps will be set forth in more detail.

Immediately after acidifying the pressed liquor to within the preferred range of about pH 4 to pH 6, the liquor is heated, indicated at 5, to within a range of about 40° C. to 55° C. and held at this temperature for a matter of about one-half to one hour. Before or during heating, I add to the liquor, with stirring, about 5 kilograms of a diatomaceous earth for each one thousand liters of pressed liquor. It seems that the addition of the diatomaceous earth not only assists in the subsequent filtration but it tends to promote more rapid crystallization of the hesperidin. Also, I find it desirable to stir the liquor continuously during the crystallizing period not only to keep the filter aid in suspension, but also to promote more rapid crystallization. As soon as it appears that crystallization, indicated at 6, is relatively complete, the liquor is passed through a filter press, step 7, preferably of the washing plate and frame type. The crystals and extraneous material as well as the filter aid are retained on, or in, the press as a cake. After the crystals have been filtered from the mother liquor and are retained on the press cake, I dissolve the hesperidin crystals therefrom, indicated at 8, by circulating through the press a solution of sodium hydroxide having a strength of about from 0.2 normal to 1 normal. This strength of sodium hydroxide is sufficient to dissolve the hesperidin crystals from the extraneous material. The solution of hesperidin obtained from the press is acidified, step 9, to below about pH 9, and preferably about pH 6, by means of a suitable acid as, for example, hydrochloric acid. After acidification, the liquor is allowed to stand for a period of from twelve to thirty-six hours within which crystallization, indicated at 10, of hespiridin takes place. Separation of the crystals, indicated at 11, from the mother liquor may then be effected by means of a centrifuge.

If it is desired to further purify the hesperidin, I have found that the hesperidin may be dissolved in a suitable quantity of pyridine. A suitable amount of a decolorizing char or activated charcoal is stirred into the hesperidin solution for the purpose of adsorbing impurities. The hesperidin solution may be heated to within a temperature range of from 90° C. to 100° C. to assist the adsorption. It is preferable to stir the solution during the adsorption step. The char is then filtered from the solution. The filtered solution is diluted with about two volumes of water to decrease the solubility of the hesperidin and to promote the crystallization thereof. The crystals are then separated by filtration or centrifugation and washed with water to remove the pyridine.

While I have suggested that the hardening or firming of the source material, indicated at 1, may be performed by the use of calcium chloride or calcium hydroxide, other calcium compounds or alkaline earth compounds or other compounds of suitable alkali may, of course, be used in place thereof.

Also, I have indicated that caustic soda is satisfactory for the purpose of adjusting the hydrogen ion concentration of the source material to within a pH range of about 10.5 to 11.5. However, any alkali which is capable of effecting such a pH and which will solubilize hesperidin, that is, which will form soluble salts of hesperidin, may be used for this purpose. Suitable examples of these are potassium hydroxide, ammonium hydroxide, sodium carbonate, etc. Ammonium hydroxide is particularly satisfactory and very convenient for this purpose, since after the extraction has taken place, and the liquor pressed from its source material, the acidity of the liquor may be reduced by merely heating to a temperature sufficient to boil off the ammonia, thereby necessitating the use of less acid for the subsequent acidification which effects precipitation of the hesperidin. Many mineral or organic acids may be used in adjusting the hydrogen ion concentration of the hesperidin liquor to below pH 9, and while I have indicated that hydrochloric acid is satisfactory for this purpose, sulphuric acid, nitric acid, citric acid, acetic acid, etc., may be used if desired.

If in the filtration step, indicated at 7, a washing type filter is not available, one may suspend the press cake containing the filter aid, extraneous material, and hesperidin crystals in a solution of sodium hydroxide having a concentration of from about 0.2 normal to 1 normal, whereupon the hesperidin crystals will be dissolved. The suspension may be again filtered and the liquor saved for the subsequent crystallization.

It is of importance to call attention to the fact that, whereas in the process disclosed in my copending application it was necessary to use considerable volumes of alcohol, one can now by the modification herein disclosed, eliminate the use of this reagent, thereby reducing the cost of preparation and lessening fire hazard.

As mentioned before, other materials may be used as the starting point for the production of hesperidin in accordance with the disclosures herein contained. For example, citrus pulp from which pectinous materials have previously been extracted, is an excellent source for the hesperidin. Also, I have found that the ground albedo from citrus fruit may be used as a starting material in place of the whole fruit. When ground albedo is used, the yield of hesperidin per ton of material processed is considerably increased.

While I have indicated that for my purpose I propose to precipitate hesperidin from its solution at a pH of from between 4 and 6, the hesperidin may be crystallized from the extraction liquor at pH values below 9.0.

Having thus described my invention in such full, clear, concise, and exact language as to enable others skilled in the art to make and use the same, I claim as my invention and desire to secure by Letters Patent the following.

I claim:

1. A process for the preparation of hesperidin which comprises the steps of adding to the source material containing hesperidin a calcium compound in an amount sufficient to coagulate the slimy components thereof, adding thereto an alkali in an amount sufficient to increase the alkalinity of said source material to within the range about pH 11 to 11.5, allowing the mixture to stand for a time sufficient to solubilize hesperidin, treating the mixture to recover an hesperidin-containing liquor therefrom, adjusting the pH of the liquor to below pH 9, adding to said liquor a suitable amount of a diatomaceous earth, heating said liquor to within a temperature range of from about 40 to 55° C. to promote the crystallization of hesperidin, filtering said liquor to separate therefrom the crystals, diatomaceous earth, and impurities, dissolving said crystals in an alkaline aqueous solution to form an hesperidin solution, acidifying said hesperidin solution to below pH 9 to promote crystallization of hesperidin and finally separating the hesperidin crystals from the solution.

2. A process for the preparation of hesperidin which comprises the steps of adding to the source material containing hesperidin calcium chloride in an amount sufficient to coagulate the slimy components thereof, adding to said material sodium hydroxide in an amount sufficient to increase the alkalinity of said material to within the range of about pH 11 to 11.5, allowing the mixture to stand for a time sufficient for the formation of soluble hesperidin compounds, pressing the mixture to recover an hesperidin containing liquor, adjusting the pH of said liquor to within a range of from pH 4 to 6, adding thereto a diatomaceous earth in the amount of about 5 kilograms for each one thousand liters of liquor, heating said liquor to within a temperature range of from about 40° C. to 55° C. to promote the crystallization of hesperidin, filtering the liquor to separate the crystals, diatomaceous earth, and impurities therefrom, dissolving said crystals in an aqueous solution of sodium hydroxide having a concentration of within the range of 0.2 normal to 1 normal, acidifying said hesperidin solution to about pH 6 with hydrochloric acid to promote crystallization of hesperidin, allowing said hesperidin to crystallize and finally separating the hesperidin crystals from solution.

3. A process for the preparation of hesperidin which comprises extracting hesperidin from source material containing the same by adjusting the alkalinity of said material to within a pH range of from 11 to 11.5, allowing the mixture to stand for a time sufficient for the formation of soluble hesperidin compounds, recovering an hesperidin containing liquor therefrom, adjusting the pH of the liquor to below pH 9, heating said liquor to promote crystallization of the hesperidin, filtering hesperidin crystals from said liquor, dissolving the crystals in an alkaline aqueous solution, acidifying the solution of crystals to below pH 9 to promote crystallization of hesperidin, allowing said crystallization to take place and finally separating hesperidin crystals therefrom.

4. A method of recovering hesperidin from source material therefor which comprises treating the source material to harden slimy components thereof, subjecting the material to alkaline treatment at about pH 11 to promote the formation of soluble hesperidin compounds, recovering a liquor containing hesperidin therefrom, reducing the pH of the liquor to below pH 9 to promote crystallization of hesperidin therefrom and adding diatomaceous earth thereto, heating said liquor to promote crystallization of hesperidin, filtering the liquor to separate hesperidin and diatomaceous earth therefrom dissolving the hesperidin in an alkaline aqueous solution to form an hesperidin solution, acidifying said hesperidin solution to precipitate hesperidin therefrom, and separating the precipitated hesperidin from the solution.

5. A method of recovering hesperidin from source material therefor which comprises subjecting the material to alkaline extraction at a pH above about 10.5 to solubilize the hesperidin, recovering a liquor containing hesperidin therefrom, reducing the pH of the liquor to below pH 9 to promote crystallization of hesperidin therefrom and adding diatomaceous earth thereto, heating said liquor to promote crystallization of hesperidin, filtering the liquor to separate hesperidin and diatomaceous earth therefrom, dissolving the hesperidin to form an hesperidin solution and recovering hesperidin from the solution.

6. A method of recovering hesperidin from source material therefor which comprises subjecting the material to alkaline extraction at a pH above about 10.5 to solubilize the hesperidin, recovering a liquor containing hesperidin therefrom, reducing the pH of the liquor to below pH 9 to promote crystallization of hesperidin therefrom and heating said liquor to promote crystallization of hesperidin, and separating the crystallized hesperidin from said liquor.

7. A method of recovering hesperidin from source material therefor which comprises subjecting the material to alkaline extraction at a pH above about 10.5 to solubilize the hesperidin, recovering a liquor containing hesperidin therefrom, reducing the pH of the liquor to below pH 9 to promote crystallization of hesperidin therefrom and heating said liquor to promote crystallization of hesperidin, removing the hesperidin crystals from said liquor, dissolving the hesperidin crystals to form an hesperidin solution and recovering hesperidin from the solution.

8. A method of recovering hesperidin from source material therefor which comprises treating the source material to harden slimy components thereof, subjecting the material to alkaline extraction at a pH above about 10.5 to solubilize the hesperidin, recovering a liquor containing hesperidin therefrom, reducing the pH of the liquor to below pH 9 to promote crystallization of hesperidin therefrom and heating said liquor to promote crystallization of hesperidin, and separating the crystallized hesperidin from said liquor.

9. A method of recovering hesperidin from source material therefor which comprises treating the source material with a calcium compound to harden the slimy components thereof, subjecting the material to alkaline extraction at a pH above about 10.5 to solubilize the hesperidin, recovering a liquor containing hesperidin therefrom, reducing the pH of the liquor to below pH 9 to promote crystallization of hesperidin therefrom and heating said liquor to promote crystallization of hesperidin, and separating the crystallized hesperidin from said liquor.

RALPH H. HIGBY.